(12) United States Patent
Wallin et al.

(10) Patent No.: US 6,581,043 B1
(45) Date of Patent: Jun. 17, 2003

(54) ROUTING NUMBER VARIABLE AND INDEXES

(75) Inventors: Mark S. Wallin, Houston, TX (US); Amy L. Swift, Albuquerque, NM (US)

(73) Assignee: First Data Corporation, Hackensack, NJ (US)

(*) Notice: Subject to any disclaimer, the term of this patent is extended or adjusted under 35 U.S.C. 154(b) by 0 days.

(21) Appl. No.: 09/474,672

(22) Filed: Dec. 29, 1999

(51) Int. Cl.[7] .............................................. G07F 17/60
(52) U.S. Cl. ........................... 705/42; 235/379; 705/45
(58) Field of Search ............................. 705/42, 45, 18, 705/24, 70; 235/379; 902/26

(56) References Cited

U.S. PATENT DOCUMENTS

| | | | |
|---|---|---|---|
| 5,679,940 A | * 10/1997 | Templeton et al. | 235/375 |
| 6,129,273 A | * 10/2000 | Shah | 235/375 |
| 6,195,452 B1 | * 2/2001 | Royer | 382/135 |
| 6,390,362 B1 | * 5/2002 | Martin | 235/379 |

FOREIGN PATENT DOCUMENTS

| WO | WO 97/00483 | * 1/1997 |
|---|---|---|

OTHER PUBLICATIONS

"Intell–A–Check! Software Provides Financial Institutions With Turnkey NACHA–Compliant Solution to Accept Non-Recurring ACH Payments Via Phone", Business Wire, Jul. 12, 1999.*

* cited by examiner

*Primary Examiner*—F. J. Bartuska
(74) *Attorney, Agent, or Firm*—Brooks & Kushman P.C.

(57) ABSTRACT

The invention involves a system and a method of using a bank routing number having a predetermined return rate stored in a database of a plurality of bank routing numbers, each having an associated return rate for risk analysis of check honoring approval or denial, fraud detection, and the formulation of collection strategies. The invention provides for a system and method of improving the efficiency and accuracy of a risk analysis program of check honoring. The invention includes classifying each of a plurality of bank routing numbers to one of predetermined index numbers based on the associated return rates of the plurality of bank routing numbers, receiving the bank routing number, processing the bank routing number to access the index number to which the bank routing number is classified, and incorporating the accessed index number of the bank routing number in the analysis for check honoring.

6 Claims, 1 Drawing Sheet

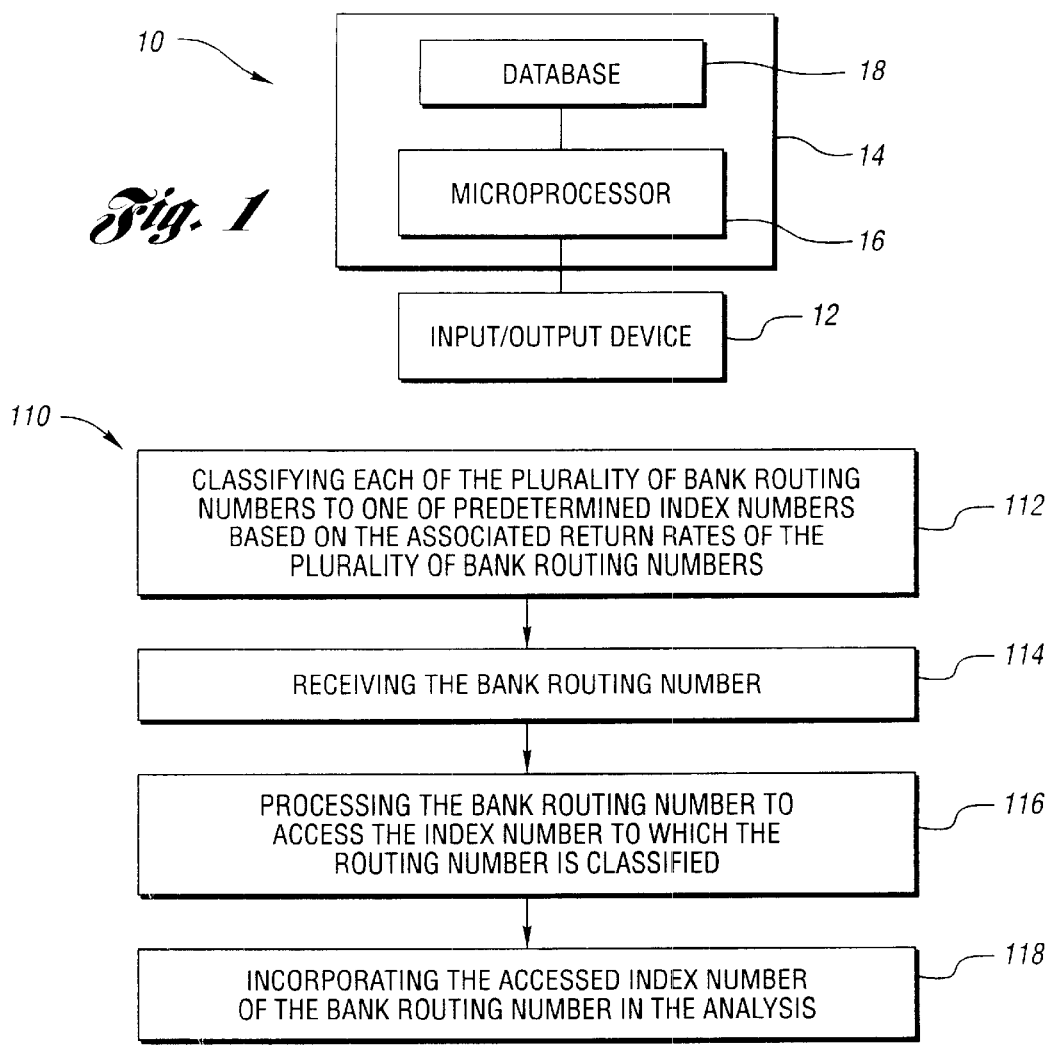

ROUTING NUMBER VARIABLE AND INDEXES

TECHNICAL FIELD

The present invention relates to a system and method of using a bank routing number having a predetermined return rate stored in a database for risk analysis of check honoring approval or denial, recovery strategy formulation, and fraud detection.

BACKGROUND ART

Check honoring has grown ever so common. The continuous increase in the transmission of information has lowered the need to constantly carry cash and has, in effect, heightened the use of writing checks. Also, check writing provides an easy way for a customer to make a purchase or obtain cash without visiting a bank or an electronic teller.

Likewise, check/customer analysis of various sorts has increased in number and in types used. Typically, at a point of transaction in which a check is written, a merchant or an entity paid by the merchant performs a check/customer analysis in order to determine whether to accept or honor the check. Depending on parameters and calculations that are to be used, there are several ways of performing such analysis.

For example, a number of parameters specific to the transaction are processed and incorporated within an analysis program. The parameters used may include, e.g., time of day, date, check number, check amount, of the customer, etc. Each available parameter specific to the transaction is given a subscore reflecting the collectibility of the check based on historical information of the consumer. Each parameter may, and typically is, weighted in accordance with its relative importance within the analysis. In this example, the subscores for each parameter are added to provide a risk score. The risk score is then classified within a predetermined scale of scores. Depending on the reference used, the risk score may or may not fall within an approval range. If it does, then the check is approved, and if not, then the check is denied. The merchant is notified of the result.

Other programs or models may also be used to apply the number of parameters specific to the transaction. For example, a neural network model may be used to process and incorporate the parameters. Typically, neural network models allow more complex analysis given a number of variables. Network models may group specific variables together for analysis rather than separately, allowing a more in-depth analysis.

Check acceptance companies which provide electronic check conversion, check guarantee, check verification, and collection services continue to improve their analysis programs in order to function more efficiently and accurately. Parameters obviously contribute to the efficiency and accuracy of the risk score of a particular check writer. As stated above, some parameters may be weighted in accordance with their importance within the analysis. Typically, the more importance or weight applied to a parameter, the more the parameter is directly related to determining the collectibility of the check.

Typically, checks have information disposed thereon that would be useful for risk analysis of check writing approval or denial. More specifically, checks include a Magnetic Ink Character Recognition (MICR) line disposed on the bottom of the check which contains a routing number. The routing number is typically a 9-digit number used for identifying a location of the bank from which the check was issued. For example, routing number 021000018 may be broken down wherein 02 is indicative of the federal district in which the bank is located. Each federal district has branches (regions) within it. One 0 may represent the federal region within the federal district of the bank. 001 may represent the bank number used to identify the specific bank within the region. 8 may be a check digit that is used by a modulus calculation to determine that the routing number is valid.

It has been found that return rates of checks may be categorized by routing number. It is known that banks around the world conduct different risk analysis prior to opening new accounts for their customers. Some banks may have high standards for new account approval and some banks have lower standards therefor. Thus, banks which conduct risk analysis with lower standards typically have a higher return rate than the rest. A bank's return rate may also be affected by factors such as overdraft protection policies and other policies internal to the bank. Such banks may be identified by way of routing numbers. If there was a way to harness this information for risk analysis, risk analysis programs would be enhanced.

Thus, what is needed is a system and method of using a bank routing number having a predetermined return rate stored in a database for risk analysis of check writing approval or denial. What is also needed is a system and method of using a bank routing number to improve the efficiency and accuracy of a risk analysis program or model of check honoring approval or denial.

DISCLOSURE OF INVENTION

Accordingly, it is an object of the present invention to provide a check honoring or recovery system and method of using a bank routing number having a predetermined return rate stored in a database for risk analysis of the check presented for approval or denial.

It is a further object of the present invention to provide a check honoring or recovering system and method of using a bank routing number for risk analysis of the check presented for honoring or recovering in order to improve the efficiency and accuracy of a risk analysis program.

A more specific object of this invention is a method of using a bank routing number having a predetermined return rate stored in a database of a plurality of bank routing numbers, each having an associated return rate for risk analysis of check honoring or recovering. The method involves classifying each of the plurality of bank routing numbers to one of predetermined index numbers based on the associated return rates of the plurality of bank routing numbers, receiving the bank routing number having the predetermined return rate, and processing the bank routing number to access the index number to which the bank routing number is classified. The method further includes incorporating the accessed index number of the bank routing number in the analysis for check honoring approval or denial.

Another specific object of this invention is a system for using a bank routing number having a predetermined return rate stored in a database of a plurality of bank routing numbers, each having an associated return rate for risk analysis of check honoring approval or denial. The system comprises a first mechanism for classifying each of the plurality of bank routing numbers to one of predetermined index numbers based on the associated return rates of the plurality of bank routing numbers, a second mechanism for receiving the bank routing number having the predetermined return rate, and a third mechanism for processing the bank routing number to access the index number to which the bank routing number is classified. The system further includes a fourth mechanism for incorporating the accessed index number of the bank routing number in the analysis for check honoring approval or denial.

BRIEF DESCRIPTION OF DRAWINGS

FIG. 1 is a schematic view of the overall system in accordance with one embodiment of the present invention;

FIG. 2 is a flow chart illustrating one method of using a bank routing number for risk analysis of check writing approval or denial provided by the present invention in accordance with the system of FIG. 1; and FIG. 3 is a table illustrating an example of classifying the processed routing number within a predetermined index as provided in the present invention.

BEST MODE FOR CARRYING OUT THE INVENTION

FIG. 1 schematically illustrates a system 10 for using a bank routing number having a predetermined return rate stored in a database of a plurality of bank routing numbers, each having an associated return rate for risk analysis of check honoring approval or denial. System 10 includes an input/output (I/O) device 12, and a host computer 14 in communication with device 12. As shown, host computer 14 includes microprocessor 16 and database 18 in communication with microprocessor 16.

I/O device 12 provides a mechanism through which the bank routing number may be inputted and stored into system 10. I/O device 12 may be any type of suitable device which is capable of sensing magnetic ink and magnetic stripes from items such as checks and cards. I/O device 12 may have a magnetic swipe slot to sense a magnetic portion of a check and a magnetic stripe of a card. Additionally, I/O device 12 may have a display screen, a keypad, and a slip printer. Moreover, device 12 may include a modem which transmits the routing number to host computer 14. Also, a plurality of I/O device 12 may be used in order to allow multiple access to system 10. For example, device 12 may be a product having a trade name ACCELERA™ manufactured by TeleCheck Services, Inc. I/O device 12 may be disposed at any point of transaction in which the check writer may write a check.

As stated above, host 14 includes microprocessor 16 and database 18. Database 18 provides a mechanism for storing return rates of a plurality of routing numbers to banks such that the routing number from device 12 may be classified as described below. Microprocessor 16 and database 18 may be in communication by any suitable means, such as by hardware.

Database 18 may be any type of suitable medium in which the information may be stored. For example, database 18 may be a disk drive and a control or a plurality of disk drives and controls having the trade name STORAGEWORKS™ manufactured by Digital Equipment Corporation and having a storage capacity of 9 gigabytes.

Microprocessor 16 provides a mechanism for classifying each of the plurality of bank routing numbers to one of predetermined index numbers based on the associated return rates of the plurality of bank routing numbers. Microprocessor 16 also provides for a mechanism for receiving the bank routing number having the predetermined return rate and for processing the bank routing number to access the index number to which the bank routing number is classified. Microprocessor 16 further provides a mechanism for incorporating the index range of the classified routing number in risk analysis models, including those used for check honoring approval or denial.

Microprocessor 16 may be any suitable processor which is capable of fulfilling the functions of classifying each of the plurality of bank routing numbers, receiving the bank routing number, processing the bank routing number to access the index number to which the bank routing number is classified, and incorporating the accessed index number of the bank routing number in the risk analysis program. For example, microprocessor 16 may be a processor having the trade name AXPT™ manufactured by Digital Equipment Corporation and having 600–650 megahertzes of speed and any suitable amount of memory. Moreover, a plurality of processors may be used.

The means through which device 12 and host computer 14 are in communication may be by telecommunication networks. As stated above, device 12 has a modem which may be used to communicate with host computer 14. Likewise, host computer 14 may also have a modem to transmit and receive information.

It is to be noted that system 10 shown in FIG. 1 is merely one example of a system of the present invention. Other systems used do not fall beyond the scope or spirit of this invention.

FIG. 2 illustrates an example of a method of the present invention in accordance with system 10 of FIG. 1. In this embodiment, return rates are pre-stored in database 18. The return rates indicate the percentage of returned checks for routing numbers to a plurality of banks. Prior to check honoring, microprocessor 16 classifies each of the plurality of bank routing numbers to one of predetermined index numbers in 112. Each of the plurality of bank routing numbers are classified based on the associated return rate thereof. The classification of each of the bank routing numbers to its index number is stored in database 18.

More specifically, in one embodiment, microprocessor 16 may categorize each of the plurality of bank routing numbers within a predetermined range of return rates. The predetermined range may be a range included within a set of predetermined ranges of the associated return rates of the bank routing numbers. Microprocessor 16 then classifies each of the plurality of bank routing numbers to one of a plurality of predetermined index numbers. In this embodiment, the classification of each of the routing numbers to its index number is based on the predetermined range within which the routing number is categorized.

For example, routing numbers with the same or within a predetermined range of return rates may initially be categorized together. As shown in FIG. 3, routing numbers with return rates between 0.012% and 0.017% may be categorized together and classified as having an index number of 1. Higher ranges of return rates of routing numbers may have higher index numbers as shown. Bank routing numbers may be classified by any other suitable means such as letters or symbols. Moreover, the ranges of return rates which each index may represent may be predetermined according to the analysis program being implemented.

At check honoring, I/O device 12 receives a bank routing number from a check. Device 12 transmits the routing number to host computer 14 by way of, for example, telephone networks. Device 12 may also transmit a transaction amount representing an amount that the check writer desires to write.

Microprocessor 16 receives the bank routing number from device 12 in 114 and processes the routing number to access the index number to which the bank routing number is classified in database 18 in 116.

As shown in FIG. 3, the predetermined index within which the routing number is classified may be a range within a table having a plurality of ranges of possible return rates. In this embodiment, the range in which the return rate of the bank routing number falls indicates the index within which the routing number is classified. For example, as shown in FIG. 3, a return rate of 0.013% falls within a range indicated by index 1.

As shown in FIG. 3, depending on a point of reference used to indicate the return rate, the index number may vary for a return rate as desired. In this embodiment, a higher return rate, provides a higher index number. For example, a return rate of 0.036% provides an index number of 2. On the contrary, a return rate of 8.98% provides an index number of 30, resulting in a less favorable value of the index number. Such value may adversely affect a risk score of the risk analysis in which the index number is incorporated.

As shown in FIG. 2, microprocessor 16 then incorporates the index number of the bank routing number in a risk analysis in 118. For example, the risk analysis may be configured to determine a risk score (as stated above) which is affected by a plurality of parameters, one of which being the index of the classified routing number. Through the risk analysis, microprocessor 16 accesses respective historical check writing information of the check writer from database 18. In one embodiment, the parameters including the index of the classified routing number may be incorporated within calculations in order to determine a subscore for each parameter. The subscores may then be added to determine the risk score of the check writer. Depending on how directly related the index is to the collectability of a check, the index may vary on its affect on the risk score.

The subscores for the parameters may be determined using different calculations based on a predetermined importance of each parameter. For example, microprocessor 16 may be configured to weigh the index of the routing numbers with the most importance. In this situation, the importance placed on the index may be mathematically represented in the calculations, providing greater affect on the risk score than the other parameters. Depending on a point of reference, the analysis may be affected by having a higher or lower value.

It is to be noted that the method of using the bank routing number may be applied toward the collections aspect of scoring. That is, incorporating the accessed index number of the bank routing number in the analysis for check honoring may be applied in assessing which strategies would be most efficient and effective for collectability. Different index numbers may call for different strategies to be implemented. A recovery or collections situation regarding a check writer having a low index number, indicating a low return rate, may be easily resolved by merely correspondences to the check writer. However, a collections situation regarding a check writer having a high index number, indicating a high return rate, may require more serious measures, such as hiring a collection agency. Different strategies may include, for example, correspondences, hiring collection agencies, merely redeposits, or telephone inquiries. Thus, incorporating the accessed index number of the bank routing number in the analysis would be helpful in determining the type of strategy to be used for recovering or collecting funds.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of using a bank routing number having a predetermined return rate stored in a database of a plurality of bank routing numbers each having an associated return rate for a risk analysis of check honoring or recovering, the method comprising:

classifying each of the plurality of bank routing numbers to one of predetermined index numbers based on the associated return rates of the plurality of bank routing numbers;

receiving the bank routing number having the predetermined return rate;

processing the bank routing number to access the index number to which the bank routing number is classified; and incorporating the accessed index number of the bank routing number in the analysis.

2. The method of claim 1 wherein each of the associated return rates indicates the percentage of returned checks for the respective routing number.

3. The method of claim 1 wherein the classification of each of the plurality of bank routing numbers to one of predetermined index numbers is stored in the database.

4. The method of claim 1 wherein classifying includes categorizing each of the plurality of bank routing numbers within a predetermined range of the associated return rates of the plurality of bank routing numbers.

5. The method of claim 4 wherein classifying further includes classifying each of the plurality of bank routing numbers to one of predetermined index numbers based on the predetermined range within which each of the plurality of bank routing numbers is categorized.

6. A system for using a bank routing number having a predetermined return rate stored in a database of a plurality of bank routing numbers each having an associated return rate for a risk analysis of check honoring or collections, the system comprising:

a first mechanism for classifying each of the plurality of bank routing numbers to one of predetermined index numbers on the associated return rates of the plurality of bank routing numbers;

a second mechanism for receiving the bank routing number having the predetermined return rate;

a third mechanism for processing the bank routing number to access the index number to which the bank routing number is classified;

a fourth mechanism for incorporating the accessed index number of the classified routing number in the analysis.

* * * * *